United States Patent
Bartscht et al.

(10) Patent No.: US 9,316,497 B2
(45) Date of Patent: Apr. 19, 2016

(54) LEVEL SENSOR

(71) Applicant: Hella KGaA Hueck & Co., Lippstadt (DE)

(72) Inventors: Manfred Bartscht, Salzkotten (DE); Thomas Elpermann, Telgte (DE); Steffen Hoppe, Lippstadt (DE); Eckart Wirries, Lippstadt (DE)

(73) Assignee: HELLA KGAA HUECK & CO. (DE)

( * ) Notice: Subject to any disclaimer, the term of this patent is extended or adjusted under 35 U.S.C. 154(b) by 1 day.

(21) Appl. No.: 14/381,557

(22) PCT Filed: Mar. 5, 2013

(86) PCT No.: PCT/EP2013/054318
§ 371 (c)(1),
(2) Date: Aug. 27, 2014

(87) PCT Pub. No.: WO2013/131869
PCT Pub. Date: Sep. 12, 2013

(65) Prior Publication Data
US 2015/0047212 A1 Feb. 19, 2015

(30) Foreign Application Priority Data
Mar. 8, 2012 (DE) .......................... 10 2012 101 962

(51) Int. Cl.
*G01C 9/06* (2006.01)
*G01D 5/12* (2006.01)
*G01D 11/30* (2006.01)
*G01C 9/28* (2006.01)

(52) U.S. Cl.
CPC .. *G01C 9/06* (2013.01); *G01C 9/28* (2013.01); *G01D 5/12* (2013.01); *G01D 11/30* (2013.01)

(58) Field of Classification Search
CPC .............. G01C 9/02; G01C 9/28; G01D 5/12; G01D 11/30
USPC ....................... 33/1 N, 1 PT, 366.11
See application file for complete search history.

(56) References Cited

U.S. PATENT DOCUMENTS

| | | | | |
|---|---|---|---|---|
| 6,354,162 | B1 * | 3/2002 | Bobay | G01D 11/30 310/68 B |
| 6,491,505 | B1 * | 12/2002 | Hueser | F04C 23/00 417/312 |
| 2003/0182810 | A1 * | 10/2003 | Sano | B62D 15/02 33/1 PT |

(Continued)

FOREIGN PATENT DOCUMENTS

DE 3212962 C2 2/1984
DE 4405721 C1 3/1995

(Continued)

*Primary Examiner* — G. Bradley Bennett
(74) *Attorney, Agent, or Firm* — Husch Blackwell LLP

(57) ABSTRACT

A level sensor for a motor vehicle includes a housing, a rotor rotatably mounted on the housing, and a printed circuit board enclosed in the housing. The printed circuit board includes at least one stator and is connected to a plug which can be attached to an opening in the housing, and seals the opening thereby. The printed circuit board and electronic components are readily and permanently protected against environmental influences. Housing has a chamber for accommodating the printed circuit board, and the opening is allocated to the chamber. The chamber is closed on all sides, with the exception of the opening. The printed circuit board can be inserted in the chamber in the manner of a drawer and can be positioned therein.

6 Claims, 3 Drawing Sheets

(56) References Cited

U.S. PATENT DOCUMENTS

| | | | | |
|---|---|---|---|---|
| 2004/0244210 | A1* | 12/2004 | Harrer | G01D 5/264 33/1 PT |
| 2010/0102496 | A1* | 4/2010 | Taniguchi | B23Q 11/127 269/55 |
| 2014/0161640 | A1* | 6/2014 | Geue | F04C 29/066 417/312 |
| 2014/0312885 | A1* | 10/2014 | Vellaiyanaicken | G01D 5/2046 324/207.25 |
| 2015/0160041 | A1* | 6/2015 | Hikichi | G01D 5/34707 324/207.25 |
| 2015/0168140 | A1* | 6/2015 | Elpermann | G01D 5/24442 73/431 |

FOREIGN PATENT DOCUMENTS

| | | |
|---|---|---|
| DE | 19733719 C1 | 4/1999 |
| EP | 0617260 A1 | 9/1994 |

* cited by examiner

LEVEL SENSOR

CROSS REFERENCE

This application claims priority to PCT application number PCT/EP2013/054318, filed Mar. 5, 2013, which itself claims priority to German Application No. 10 2012 101962.2, filed Mar. 8, 2012, both of which are hereby incorporated by reference.

FIELD OF THE TECHNOLOGY

The invention relates to a level sensor for a motor vehicle, comprising a housing, a rotor, rotatably mounted on the housing, a printed circuit board, enclosed in the housing, which comprises at least one stator, and a plug, which can be fastened to an opening in the housing, and seals the opening thereby.

BACKGROUND

Level sensors of this type are known per se, and are predominantly used in motor vehicles in order to identify rotational and displacement motions of two components in relation to one another, e.g. in order to detect a tilting of the motor vehicle and for a corresponding regulation of headlamps.

A position sensor is known from EP 670 473 A, in which a printed circuit board is disposed in a housing. The housing can be closed at a main surface with a relatively large cover, and must additionally be sealed outwardly to a rotor. On the whole, the protection for the printed circuit board from external influences is extremely complex.

EP 943 469 A describes a sensor in which two printed circuit boards are disposed in a housing. Here as well, the sealing of the housing is very complex, due to a large cover, and due to an opening for the rotor.

A sensor is disclosed in DE 10 2007 034 099 A in which a printed circuit board and/or electronic components are sealed in a housing with a casting compound. This type of protection is comparably complex and expensive.

SUMMARY OF THE INVENTION

It is therefore the objective of the invention to create a level sensor, with which a printed circuit board and electronic components are readily and permanently protected securely against environmental influences, and which is, at least, no more complicated to produce thereby than the known sensors.

The housing has a chamber for accommodating the printed circuit board, and the opening is allocated to the chamber, wherein the chamber, with the exception of the opening, is closed on all sides, and wherein the printed circuit board can be slid into the chamber in the manner of a drawer, and positioned therein. By this means, sensitive components of the level sensor, specifically the printed circuit board, electronic components, and contacts, are protected in the chamber from environmental influences such as humidity, moisture, gases and dust, to the greatest possible extent, by means of the housing. The opening can be kept small, corresponding to the width of the printed circuit board, such that it can be readily sealed. For this, the plug also serves as a cover for the opening; as a seal, e.g. a simple O-ring is disposed between the housing and the plug. In this manner, the sensitive components of the level sensor are securely and permanently enclosed in a sealed manner.

The insertion of the printed circuit board into the chamber, in the manner of a drawer, ensures a simple installation of the level sensor and a precise positioning of the stator in relation to the rotor.

Guide ramps on the interior lateral walls of the chamber are a preferred means, in terms of design, for bringing the printed circuit board into a predetermined position when inserted in the chamber. The printed circuit board is thus securely guided at its longitudinal sides when inserted, and brought to the required minimal spacing to a position of the rotor.

In a further design, the printed circuit board is attached to the plug prior to its installation in the chamber, and provided with electrical contact thereby. By this means, the secure electrical contact of the printed circuit board is ensured, on one hand. On the other hand, the production of the level sensor is simplified.

In a further design, deformable structures are disposed in the region of the guide ramps, for an exact positioning of the stator in relation to the rotor. The deformable structures are, e.g. thin fins, which can be partially deformed when the printed circuit board is inserted in the chamber, thus compensating for a potential play between the guide ramps and the printed circuit board.

In a further design, an elastic seal is disposed between the housing and the plug. Seals of this type, e.g. made of silicone or foam rubber, reliably and permanently seal, and are inexpensive. The housing and plug can be separated from one another readily. Alternatively, a material bonded seal is formed, which is produced, e.g. by means of laser welding. By this means, the cover is attached to the housing at the same time.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
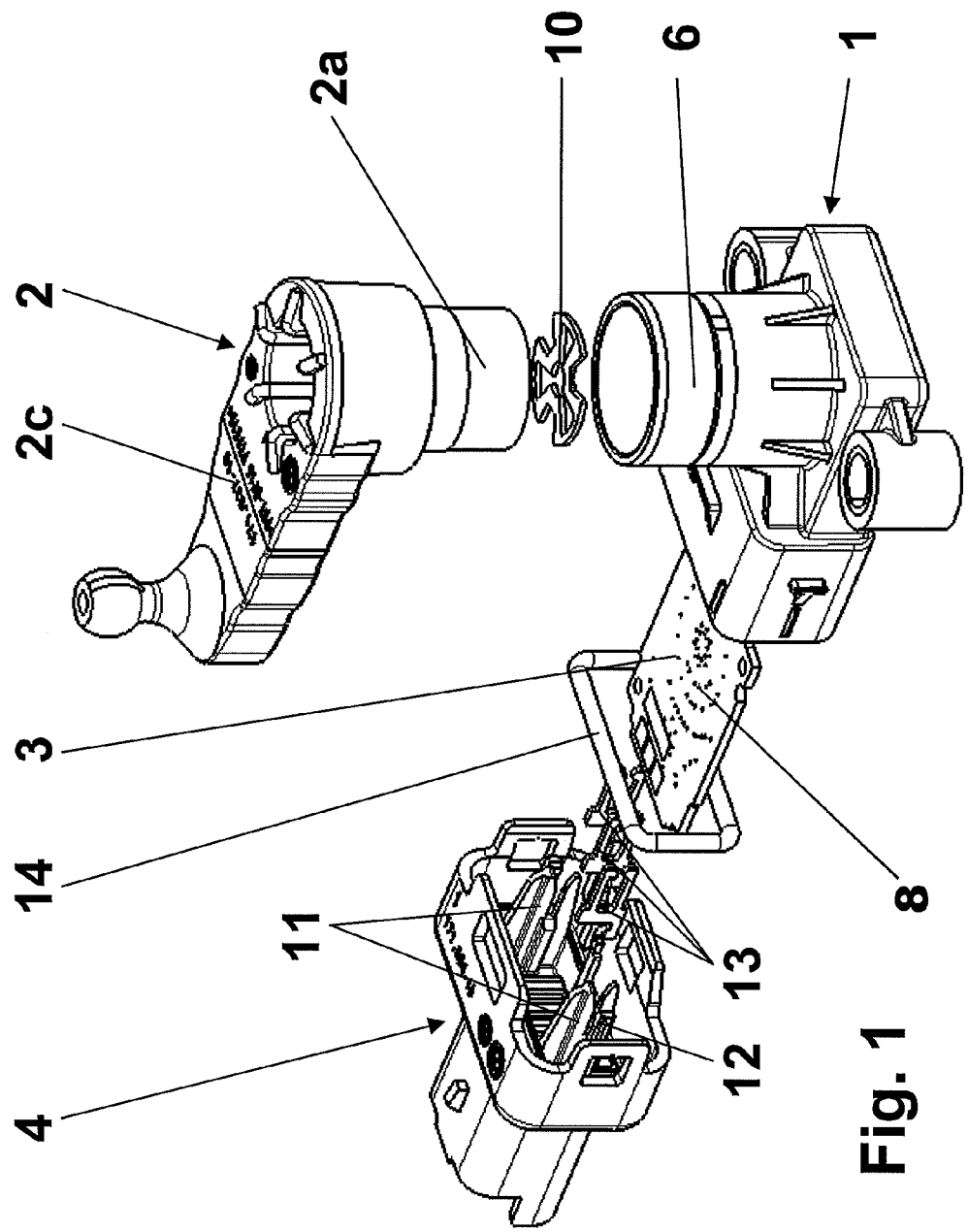
FIG. 1 is a perspective exploded view of a level sensor.
Figure 2:
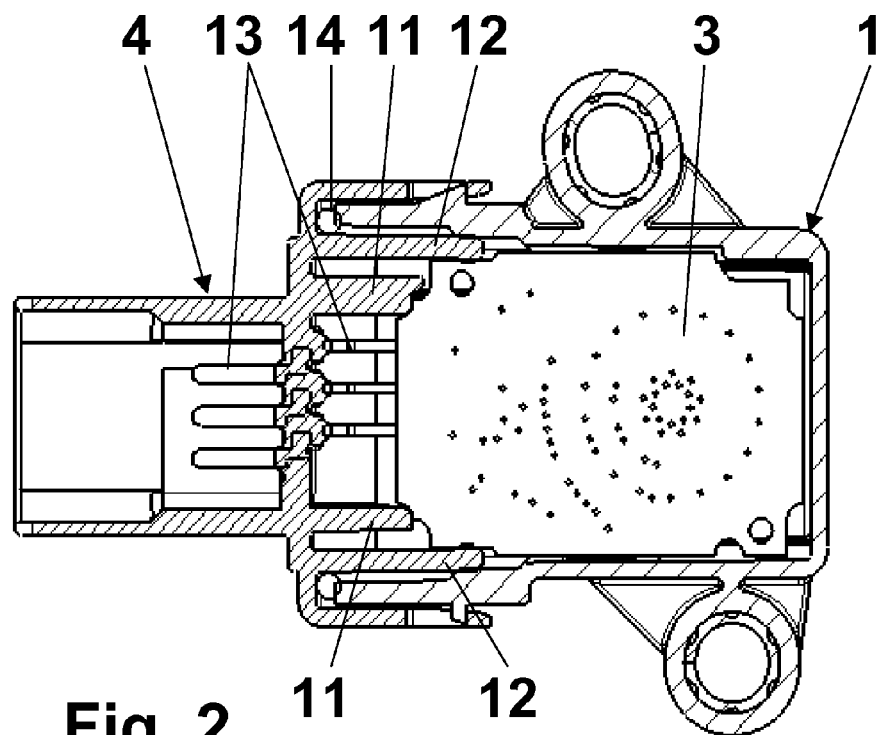
FIG. 2 is a horizontal cut through the level sensor.
Figure 3:
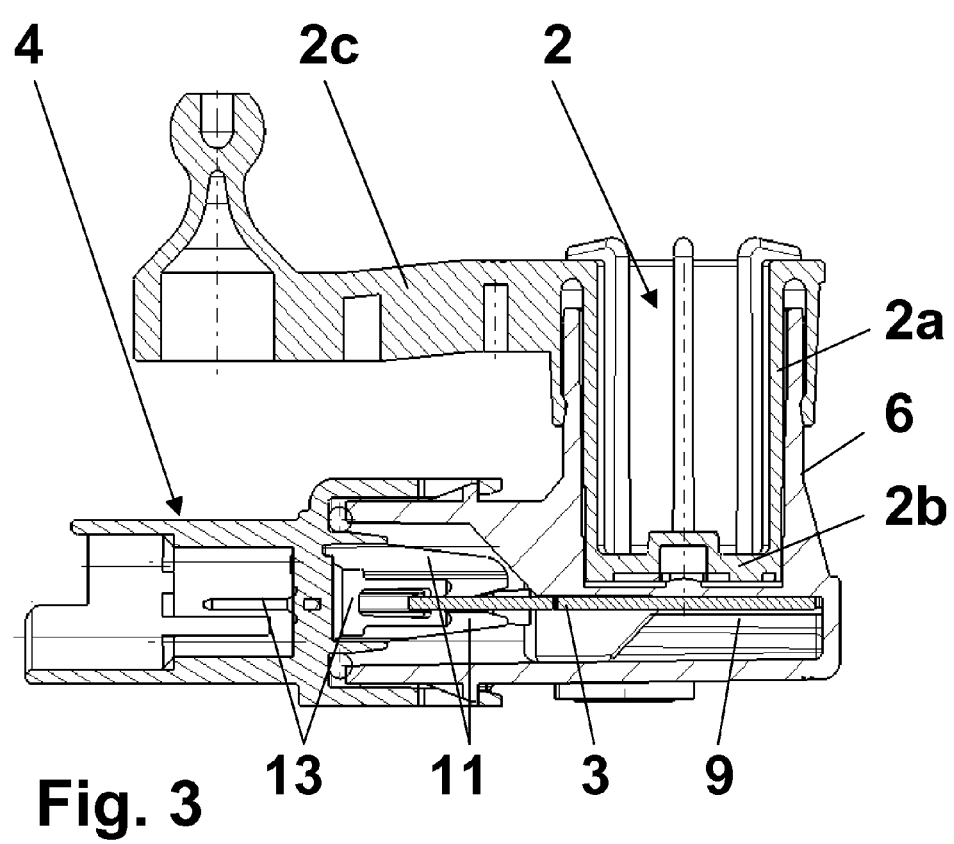
FIG. 3 is a vertical cut through the level sensor.
Figure 4:
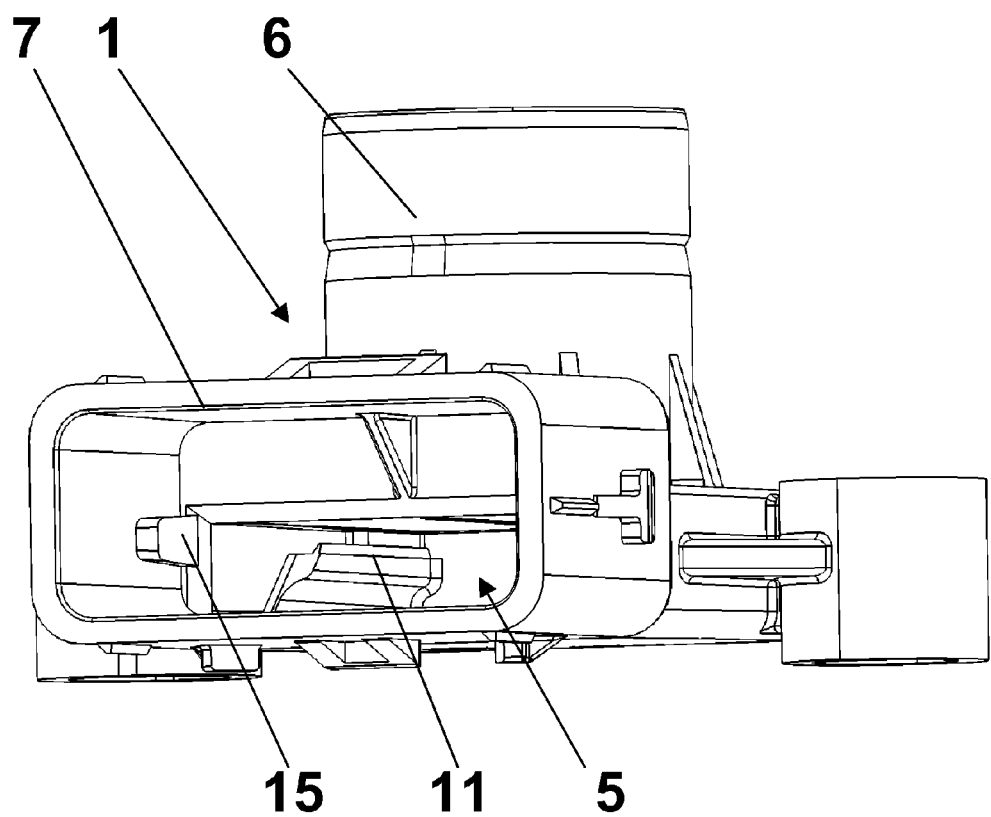
FIG. 4 is a view of an opening in the housing.

As is visible in FIGS. 1-4, a level sensor comprises a housing 1, a rotor 2, a printed circuit board 3, and a plug 4.

The housing 1 comprises a chamber 5 and a cylinder 6 formed on the outside thereof, having a circular cross-section. The chamber 5 is closed on all sides, with the exception of an opening 7 disposed on a broadside of the housing 1. The chamber 5 is substantially rectangular in the horizontal plane; it has two different heights in the longitudinal cut, as is particularly visible in FIG. 3. The lesser height is allocated thereby to the cylinder 6 and the greater height is allocated to the opening 7; in other words: the cylinder 6 is disposed above the portion of the chamber 5 having the smaller cross-section, and the opening 7 has the larger cross-section.

Guide ramps 9 are formed on the interior of the chamber 5, on the longitudinal sides of the part having the lesser height, which first run diagonally upward, seen from the perspective of the opening 7, thus toward the cylinder 6, and then extend parallel to the upper boundary of the chamber 5 at a predefined height. A slight spacing between the upper boundary and the guide ramps 9 corresponds thereby to a thickness of the printed circuit board 3 plus a predetermined play. In this manner, the necessary spacing between the rotor 2 and a stator 8 is ensured. Deformable structures, e.g. in the form of thin fins, are formed on the surfaces of the guide ramps 9 facing toward the upper boundary.

The rotor 2 has a cylindrical component 2a with a base 2b. A lever arm 2c is formed on an end of the cylindrical component 2a lying opposite the base 2b. The cylindrical component is rotatably mounted and locked in place in the cylinder 6 of the housing 1. A rotor structure 10 is disposed on an exterior surface of the base 2b. This is attached here, e.g. in the form of a stamped plate, or a conductor path foil.

The printed circuit board 3 has the stator 8 in the form of conductor path structures and electrical and/or electronic components, wherein the stator 8, in the installed state, corresponds to the rotor structure 10.

The plug 4 is also designed as a cover for the opening 7 in the chamber 5. For this reason, the one side of the plug 4 is designed such that it can be placed over the housing 1 in the region of the opening 7, with limited play. The plug 4 and the housing 1 can be locked to one another, wherein locking hooks are disposed on the plug 4 and corresponding locking projections are disposed on the housing 1. The printed circuit board is attached at the portion of the plug 4 forming the cover, and electrical contact is established there. For this, two retaining tongues 11, two retaining fingers 12 and three contact tongues 13 are disposed in the plug 4 on the cover side.

The retaining tongues 11 and the retaining fingers 12 are formed as a single unit with the plug 4. Each retaining tongue 11 has a slit in the center, such that it can encompass an edge region of the printed circuit board 3 in a clamping manner. The retaining fingers 12 serve for the lateral guidance and positioning of the printed circuit board 3 in the plug 4.

Ribs 15 corresponding to the retaining fingers 12 are disposed in the chamber 5, which press the retaining fingers 12 together when plug 4 is place on the housing 1. The ribs 15 have deformable structures, like the guide ramps 9, on their surfaces.

The contact tongues 13 are made of metal, and attached to the plug 4. Each contact tongue 13 has slits, like the retaining tongues 11, on the cover side, where, with the fingers designed in this manner, their free ends are bent toward one another. These free ends establish contact in a clamping manner with contact surfaces allocated thereto on the printed circuit board 3. At the plug side, the contact tongues 13 are designed for conventional plug-in connectors.

In order to seal the chamber 5, an O-ring 14 or a molded seal is disposed in the region of the opening 7, between the housing 1 and the plug 4.

For the production of the level sensor, first the individual components are manufactured. The housing 1, the rotor 2, and the plug 4 are molded separately from plastic, wherein the contact tongues 13 are attached to the plug 4. The rotor structure 10 is attached to its base 2b, either by means of the molding of the rotor 2, or after the molding thereof.

The printed circuit board 3 is attached to the plug 4, in that it is inserted in the slit at a predetermined side, until it assumes a position defined by the retaining finger 12 and stops. The printed circuit board 3 is retained on the plug 4 thereby in a clamping manner. The contact tongues 13 establish electrical contact with the contact surfaces of the printed circuit board allocated thereto.

The plug 4, together with the printed circuit board 3, is attached to the housing. For this, the printed circuit board 3 is pushed through the opening 7 in the chamber, wherein the edge regions of the printed circuit board 3 slide over the guide ramps 9, and, if applicable, the deformable structures become deformed at this point. The retaining fingers 12 slide along the ribs 15, and are thus pressed against the printed circuit board 3. If applicable, the deformable structures are also deformed thereby. The deformable structures thus prevent play between the printed circuit board 3 and the means retaining it, such that the stator 8 assumes precisely a predefined position. The locking hooks of the plug 4 lock in place with the locking projections of the housing 1, such that the plug is securely and tightly sealed.

The cylindrical component of the rotor 2 is pressed into the cylinder 6 of the housing 1, and locked in place. The rotor structure 10 and the stator 8 assume predefined positions in relation to one another thereby, which are necessary for the flawless functioning of the level sensor.

LIST OF REFERENCE SYMBOLS 1 housing
2 rotor
2a cylindrical component
2b base
2c lever arm
3 printed circuit board
4 plug
5 chamber
6 cylinder
7 opening
8 Stator
9 guide ramp
10 rotor structure
11 retaining tongues
12 retaining fingers
13 contact tongues
14 O-ring
15 ribs

The invention claimed is:

1. A level sensor for a motor vehicle, comprising:
a housing;
a rotor rotatably mounted on the housing
a printed circuit board enclosed in the housing and comprising at least one stator; and
a plug (4) fastened to an opening in the housing sealing the opening;
wherein the housing has a chamber for accommodating the printed circuit board and the opening is allocated to the chamber;
wherein the chamber is closed on all sides, with the exception of the opening; and
wherein the printed circuit board is insertable into in the chamber in the manner of a drawer.

2. The level sensor according to claim 1, wherein guide ramps are formed on the internal lateral walls of the chamber.

3. The level sensor according to claim 1, wherein the printed circuit board is fastened to the plug prior to being inserted in the chamber, and provided with an electrical contact.

4. The level sensor according to claim 2, wherein deformable structures are disposed in the region of the guide ramps, for the precise positioning of the stator in relation to the rotor.

5. The level sensor according to claim 1, wherein an elastic seal is disposed between the housing and the plug.

6. The level sensor according to claim 1, wherein a material-bonded seal is formed between the housing and the plug.

* * * * *